United States Patent Office 3,171,917
Patented Mar. 2, 1965

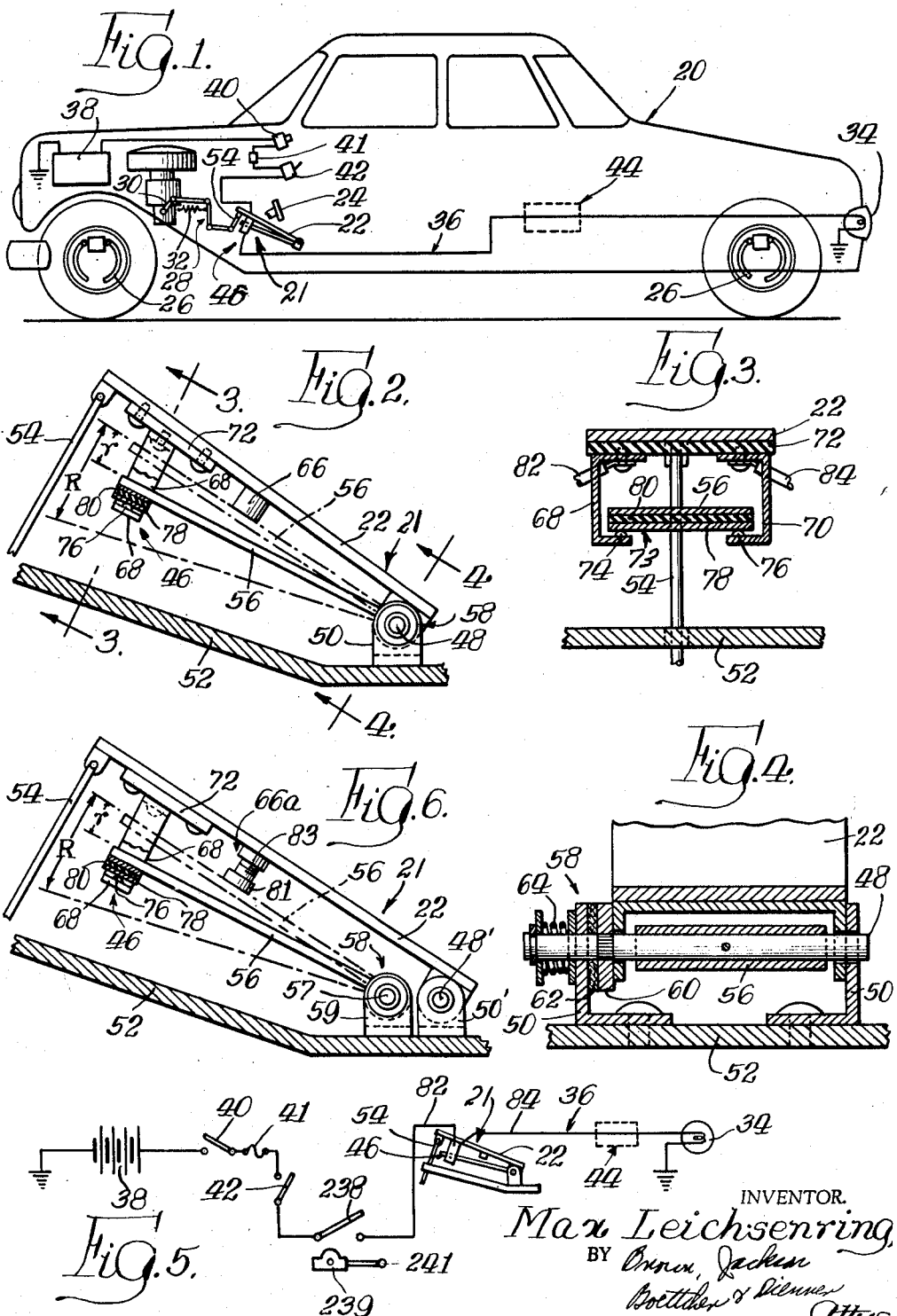

3,171,917
SIGNALLING MEANS FOR INDICATING CHANGE
IN SPEED OF AN AUTOMOTIVE VEHICLE
Max Leichsenring, 4525 N. Francisco St.,
Chicago 25, Ill.
Filed Aug. 7, 1964, Ser. No. 388,252
6 Claims. (Cl. 200—86.5)

The present application is a continuation-in-part of my application Serial No. 153,499 filed November 20, 1961 now abandoned.

The present invention relates to signaling means for automotive vehicles for effecting greater safety and convenience in the operation of such vehicles.

One object of the invention is to provide for automotive vehicles new and improved signaling means that effects a drastic reduction of driving hazards arising from the failure of a trailing motorist to become aware of the slowing of a vehicle ahead in time to avoid an accident.

Another object is to provide for automotive vehicles new and improved signaling means which automatically warns a trailing motorist of reductions of driving power in a leading vehicle which are sufficiently large to be significant from the standpoint of safety, while at the same time serving to maintain the alertness of the trailing motorist to signals from the vehicle ahead by obviating signals to the trailing motorist when driving power of the leading vehicle is reduced to a degree less than that which need be taken into account by the trailing motorist.

Another object is to provide for an automotive vehicle new and improved signaling means which automatically produces a warning signal to trailing motorists when a power control of the vehicle is operated to reduce the vehicle driving power a given predetermined amount substantially less than and over the full range of the vehicle driving power.

Another object is to provide in an arrangement as last noted a warning signal which may be energized so as to provide a steady signal or a flashing signal or combination of alternate steady and flashing signals.

Another object is to provide for an automotive vehicle improved warning means of the character recited which responds to a substantial reduction in driving power to provide a warning signal to a trailing motorist even though there may be a continued application of driving power at a very substantial level.

Another object is to provide for an automotive vehicle new and improved warning means of the character recited which responds to a substantial degree of movement of a power control element in a power decreasing direction anywhere within the range of movement of the power control element.

Another object is to provide new and improved warning signal control means of the character recited which is combined in a new and advantageous manner with the accelerator pedal for a vehicle to respond to significant control movements of the pedal.

Another object is to provide for an automotive vehicle warning control structure of the character recited which is combined advantageously with the power control linkage for the vehicle.

Another object is to provide for automotive vehicles improved control structure of the character recited which can be readily incorporated into a conventional automotive vehicle at a very moderate cost.

Other objects and advantages will become apparent from the following description of the exemplary embodiments of the invention illustrated in the drawings, in which:

FIGURE 1 is a side view of an automotive vehicle incorporating one embodiment of the invention and showing in dotted lines the optional incorporation of a cyclic switch.

FIGURE 2 is a side view of accelerator pedal and signal control structure used in the vehicle of FIGURE 1;

FIGURE 3 is a sectional view taken with reference to the line 3—3 of FIGURE 2;

FIGURE 4 is a sectional view on an enlarged scale taken with reference to the line 4—4 of FIGURE 2;

FIGURE 5 is a diagrammatic illustration of the electrical warning circuit used in the vehicle of FIGURE 1 and showing a transmission switch and in dotted lines the optional incorporation of a cyclic switch; and FIGURE 6 is similar to FIGURE 2, but illustrates a modification of an abutment structure associated with the accelerator for adjusting the predetermined amount of reduction in vehicle driving power required to effect energization of a warning signal, and a modified arrangement of the accelerator with control components of the invention.

Referring to the drawings in greater detail, the illustrated embodiment of the invention is incorporated in an automobile 20, FIGURE 1, which is operated by vehicle power control means 21 which, in part, includes an actuating member such as an accelerator pedal 22 that is depressed to increase the driving power of the vehicle. A conventional brake pedal 24 is provided and which is adapted to be depressed to apply the vehicle brakes 26.

The vehicle power control means 21 in addition to accelerator pedal 22 includes power control linkage 28 connected, as illustrated diagrammatically in FIGURE 1, with the vehicle throttle 30. The power control linkage 28 and accelerator pedal 22 are urged toward a normal or idle position by means of a conventional accelerator spring 32.

When the vehicle 20 is moving forward under power the accelerator pedal 22 of a vehicle power control means 21 is depressed and the power control linkage 28 of which the accelerator pedal is a part is displaced away from its idle position. Slowing of the vehicle is effected by reducing the foot pressure on the accelerator pedal 22 allowing the power control linkage 28 to move in a power decreasing direction. The consequent reduction in driving power tends to slow the vehicle. Slowing of the vehicle may be increased by operation of the brake pedal 24. Application of the brakes is almost invariably preceded by movement of the vehicle power control means 21 in a power decreasing direction to its idle position. Moreover, substantial movement of the vehicle power control means 21 in a power decreasing direction can effect a significant slowing of the vehicle even without application of the brakes.

Significant slowing of a lead vehicle can bring about a hazardous condition when a trailing motorist is not adequately alerted to the change in speed of the vehicle.

Conventional warning means which are responsive only to the application of the vehicle brakes do not warn a trailing motorist when a lead vehicle is being slowed by a reduction in driving power without application of the brakes. Also, there is necessarily some time lag in the activation of conventional brake controlled warning means, in that the warning means is not responsive to the first movements of the driver to slow his vehicle, that is, the movements which reduce the driving power, but only to subsequent movement, specifically application of the brakes which begins after the driver's foot has been removed from the accelerator. Measured in terms of vehicle distance traveled, the time lag between significant motions of the vehicle power control means 21 in a power decreasing direction and the application of the brakes is most significant. The forward motion of the lead vehicle during this time delay is, under tight traffic conditions, translated into corresponding forward movement of a trailing vehicle and can constitute the critical element in an accident due to the failure of a trailing motorist to slow his vehicle in time to avoid a collision.

The vehicle 20 illustrated in FIGURE 1 is equipped with warning signalling means provided by this invention that automatically signals a trailing motorist when the vehicle power control means 21 is actuated in a power decreasing direction a given predetermined amount and to a degree which is sufficient to effect a significant reduction in the speed of the vehicle, while at the same time maintaining the alertness of the trailing motorist by avoiding signaling the trailing motorist when the vehicle power control means 21 is actuated in a power decreasing direction less than the given predetermined amount and to a degree which is insufficient for effecting a reduction in vehicle speed likely to be significant from the standpoint of safety.

As illustrated in FIGURE 1, the warning signal means comprises a grounded warning light 34 on the rear of the vehicle 20 which is controlled by an electrical circuit means 36. As illustrated diagrammatically in FIGURE 1 the electrical circuit means 36 comprises the grounded vehicle battery 38, the vehicle ignition switch 40, a fuse 41, a disabling switch 42 on the vehicle dash, and control switch means 46 carried by the accelerator pedal 22, and to which control switch means the grounded warning light 34 is electrically connected. The electrical circuit means shown in FIGURE 5 includes the foregoing elements of the circuit of FIGURE 1 and in addition incorporates a clutch transmission switch 238. The switch 238 is opened to prevent flashing of the lights 34 when the vehicle engine is first started. As shown, the transmission control lever 241 operates through a control 239 to open the switch 238 when the vehicle is put in neutral for starting. The switch 238 closes upon movement of the transmission control 241 into a position for propelling the vehicle. A cyclic switch 44 of known construction may be optionally incorporated in the warning signal circuits of FIGURES 1 and 5.

As shown in FIGURES 2 to 4, the accelerator pedal 22 is disposed generally in a rearwardly and downwardly inclined position and is pivotally supported at its rear end by a horizontal support shaft 48 for swinging movement in a vertical plane. As illustrated, the shaft 48 is supported rotatably, FIGURE 4, in a pair of support brackets 50 secured to the floor board 52 of the vehicle. The forward end of the accelerator pedal connects with a push rod 54 of the control linkage 28.

The accelerator pedal 22 has an angular range of swinging movement extending downwardly from the idle position of the pedal and identified in FIGURE 2 by the letter "R." Forward and downward movement of the pedal 22 in the counterclockwise direction with reference to FIGURE 2 increases the driving power for the vehicle. Conversely, a clockwise movement of the pedal 22 with reference to FIGURE 2 decreases the vehicle driving power.

Predetermined power decreasing movement of the pedal 22 is caused to activate or energize the warning light 34 by the signal control means 46 which, as shown, comprises a movable control member 56 having a lost motion connection with the pedal 22, as will presently appear.

As shown, the movable control member 56 comprises a generally flat blade, which is preferably non-rotatably fixed to the shaft 48, FIGURE 4, on which the pedal 22 is freely pivoted. The member 56 extends forwardly in underlying relation to the pedal 22 for swinging movement by the pedal. The signal control means 46 further comprises restraining means defined by a friction brake 58, FIGURE 4, which coacts with the shaft 48 to hold the control member 56 with a limited holding torque in any position to which it is moved by the pedal 22.

As illustrated, the brake 58 comprises an annular disk 60 secured non-rotatably to the rotatable shaft 48 and axially confronting a friction washer 62 inserted between the disk 60 and the adjacent bracket 50. The disk 60 is continually urged axially against the friction washer 62 by a coiled compression spring 64 mounted to react on one of the brackets 50 and urge the shaft 48 axially, as illustrated in FIGURE 4.

The member 56 is swung in opposite directions by the pedal 22 by means which provides between the pedal and the member 56 an angular degree of lost motion "r" which is only a substantial fraction of the total angular range of motion "R" of the pedal. Moreover, the signal control means includes switch closing or operating means, hereinafter described for effecting a signal activating switching action in response to movement of the pedal 22 in a power decreasing direction to take up the lost motion "r" between the member 56 and the pedal.

As illustrated in FIGURES 2 and 3, the member 56 is swung downwardly by engagement of an abutment 66 of the signal control means with the member 56 upon depressing the pedal 22 sufficiently to take up the lost motion in a power increasing direction between the pedal and the member 56. The position which the member 56 occupies in relation to the pedal 22 upon engagement of the abutment 66 with the member 56 is illustrated in phantom in FIGURE 2.

In FIGURE 6 there is illustrated a modified form of abutment 66a having a cap member 81 threaded on a screw 83 fixed to the underside of pedal 22 to provide for adjusting the angular degree of lost motion "r" by threading of the cap on the screw. Also as shown in this figure the accelerator pedal 22 is mounted for pivotal movement on a shaft 48' supported at its opposite ends in brackets 50' similar to brackets 50. The movable member 56 is mounted at one end on a shaft 57 supported in brackets 59 along the lines of brackets 50 and with which brake means 58 as above described is associated to hold frictionally the member 56 in any position to which it is moved by pedal 22. The structure last described provides for the independent pivotal mounting of the accelerator pedal 22 and the movable member 56 and in a relationship in which swinging of the member 56 is effected by movement of the accelerator pedal in the manner above described.

The member 56 of the signal control means is swung in the opposite direction by switch control or operating means thereof to effect the desired switching action upon movement of the pedal 22 in the power decreasing direction to a degree sufficient to take up the lost motion "r" between the member 56 and the pedal.

The aforementioned switch control means comprises, two metal brackets 68, 70 which are mounted on the underside of the pedal 22, as shown in FIGURES 2 and 3, by means of an electrical insulating block 72. The lower ends of the brackets 68, 70 are turned under the member 56 and support electrical contacts 74, 76 of switch means 73 in confronting relation to opposite ends of a conductor 78 of such switch means supported on the underside of the member 56 by means of insulation 80, which electrically isolates the conductor 78 from the member 56.

The brackets 68, 70 are connected to conductors 82, 84 in the electrical circuit means, 36, FIGURES 3 and 5, so that engagement of the bridging conductor 78 with the contacts 74, 76 of switch means 73 activates the electrical circuit means for energizing the light 34.

When the vehicle 20 is put into operation incorporating the electrical circuit means of FIGURE 1, the switches 40 and 42 are closed, or if the vehicle incorporates the electrical circuit means of FIGURE 5 the switches 40, 42 and 238 are closed. When the accelerator pedal 22 is in the idle position illustrated in FIGURE 2, the contacts 74, 76, both engage the bridging conductor 78 on the member 56 and the electrical circuit means 36 is energized. This energization may be effected through the previously mentioned cyclic switch 44. Preferably the cyclic switch 44 itself is designed to provide, upon closure of the electrical circuit means 36, an intermittent full energization of the warning light 34 for a limited period of time followed by steady energization of the light 34. A cyclic switch capable of operating in this manner is disclosed in applicant's application Serial No. 29,375 filed May 16, 1960 (now abandoned), applicant's copending application Serial No. 216,163 filed August 10, 1962 which is a continuation-in-part of said application Serial No. 29,375, and in applicant's copending application Serial No. 376,527, filed June 19, 1964, which is a continuation-in-part of said application Serial No. 216,163.

Depression of the pedal 22 to supply power to move the vehicle forwardly moves the contacts 74, 76 away from the conductor 78 of switch means 73 to deenergize the warning light 34. Normally, the degree of depression of the accelerator pedal in applying power to propel the vehicle exceeds the lost motion "r" between the accelerator pedal and the member 56, whereupon the abutment 66 of the signal control means engages the member 56 to swing the member 56 downwardly against the restraining force of the brake 58. After power is applied in this fashion to propel the vehicle there may be movement of the accelerator pedal from a number of causes. Many of these movements will be slight and may not produce significant slowing of the vehicle.

Retractions of the accelerator pedal which are less than the lost motion "r" between the pedal and the member 56 do not close the electrical circuit means through the switch means 73. Consequently, small power decreasing movements of the pedal due to unsteadiness of the operator or small retractions of the pedal to meet changing traffic conditions do not produce distracting signals to trailing motorists.

Yet, any given predetermined power decreasing movement of the pedal 22, anywhere within the total range "R" of pedal movement, which exceeds the lost motion "r" engages the contacts 74, 76 with the conductor 78 of the switch means 73 to activate the electrical circuit means 36 which controls the signal light 34. As previously noted the adjustable abutment means 66a affords a convenient construction for adjusting the predetermined amount of power decreasing movement of pedal 22 required to effect energization of signal light 34.

It should be mentioned that the accelerator pedal spring 32 has sufficient strength to overcome the brake 58 to swing the member 56 in the power decreasing direction of the pedal 22 after the lost motion "r" has been overcome.

Since the brake 58 serves to hold the member 56 in any position to which it is moved, the contacts 74, 76 engage the conductor 78 to complete the circuit 36 upon return movement of the pedal 22 to its idle position, even though the previous depression of the pedal does not exceed the lost motion "r" between the pedal and the member 56.

Thus, the signal control means 46, combined with the accelerator pedal 22 operates to close the electrical circuit means 36 upon lifting of foot pressure from the pedal 22, even though the brake pedal 24 is not depressed. Also, the signal control means 46 operates to complete the electrical circuit means 36 in response to power decreasing movement of the pedal 22 exceeding the lost motion "r," even though the pedal 22 remains depressed. However, retraction of the pedal 22 which does not exceed the lost motion "r" or return the pedal to its normal position does not close the electrical circuit means 36.

It will be appreciated that the invention is not limited to use of the particular structure illustrated, but includes the use of equivalents and alternatives within the spirit and scope of the invention as defined by the claims.

I claim:

1. For use in an automotive vehicle having rearwardly visible warning signal means, electrical circuit means for energizing said warning signal means, and vehicle power control means comprising an actuating member movable over a first predetermined range of movement in power increasing and decreasing directions, the combination of signal control means comprising a control member movable by and relative to said actuating member of said vehicle power control means, and restraining means for said movable control member for restraining movement of the latter, control switch means for said electrical circuit means arranged between said control member and said actuating member, and said signal control means including lost motion connecting means between said actuating member and said control member providing for opening of said control switch means by movement of said actuating member in power increasing direction, and for movement of said control member against said restraining means by said actuating member in a second predetermined range of movement thereof less than said first predetermined range of movement of said actuating member so as to effect closing of said control switch means upon movement of said actuating member in its power decreasing direction in the amount of said second predetermined range of movement and over said first predetermined range of movement of said actuating member of said vehicle power control means.

2. For use in an automotive vehicle having rearwardly visible warning signal means, electrical circuit means for energizing said warning signal means, and vehicle power control means comprising an actuating member movable over a first predetermined range of movement in power increasing and decreasing directions, the combination of signal control means comprising a control member movable by and relative to said actuating member of said vehicle power control means, and restraining means for said movable control member for restraining movement of the latter, control switch means for said electrical circuit means arranged between said control member and said actuating member, a cyclic switch in said electrical circuit means, and said signal control means including lost motion connecting means between said actuating member of said vehicle power control means and said control member providing for opening of said control switch means by movement of said actuating member in power increasing direction and for movement of said control member against said restraining means by said actuating member in a second predetermined range of movement thereof less than said first predetermined range of movement of said actuating member so as to effect closing of said control switch means upon movement of said actuating member in its power decreasing direction in the amount of said second predetermined range of movement and over said first predetermined range of movement of said actuating member of said vehicle power control means.

3. For use in an automotive vehicle having rearwardly visible warning signal means, electrical circuit means for energizing said warning signal means, and vehicle power control means comprising an actuating member movable over a first predetermined range of movement in power increasing and decreasing directions, the combination of signal control means comprising a control member movable by and relative to said actuating member of said vehicle power control means, and restraining means for said movable control member for restraining movement of the latter, control switch means for said electrical circuit means between said control member and said actuating member, said signal control means including lost motion connecting means between said actuating member and said control member providing for opening of said control switch means by movement of said actuating member in power increasing direction, and for movement of said control member against said restraining means by said actuating member in a second predetermined range of movement thereof less than said first predetermined range of movement of said actuating member so as to effect closing of said control switch means upon movement of said actuating member in its power decreasing direction in the amount of said second predetermined range of movement and over the said first predetermined range of movement of said actuating member of said vehicle power control means, and means for adjusting the range of said second predetermined range of movement of said control member by said actuating member.

4. For use in an automotive vehicle having power and warning signal control means, a pivotally mounted vehicle power control pedal, the combination of a movable control member supported for swinging movement below said pedal about a fixed axis, restraining means coacting with said control member to continuously apply thereto a limited restraining force tending to hold the member against swinging movement about its axis, means between said pedal and said member forming a lost motion connection to provide for limited lost motion of said pedal relative to said member and for movement of said member by said pedal upon movement of said pedal to a degree exceeding the lost motion between said pedal and said member, switch means between said member and said pedal, and operating means for said switch means to effect operation of said switch means upon movement of said pedal in a power increasing direction in relation to said member and to effect operation of said switch means as an incident to movement of the pedal in a power decreasing direction to take up said lost motion between the pedal and member.

5. For use in an automotive vehicle having power and warning signal control means, a pivotally mounted vehicle power control pedal, the combination of a movable control member supported for swinging movement below said pedal about a fixed axis, restraining means coacting with said control member to continuously apply thereto a limited restraining force tending to hold the member against swinging movement about its axis, means between said pedal and said member providing for limited lost motion of said pedal relative to said member and for movement of said member by said pedal upon movement of said pedal to a degree exceeding the lost motion between said pedal and said member, switch means between said member and said pedal, and means to effect opening of said switch upon movement of said pedal in a power increasing direction in relation to said member, and to effect closing of said switch as an incident to movement of pedal in a power decreasing direction in an amount to take up said lost motion between said pedal and said member.

6. For use in an automotive vehicle having power and warning signal control means, a pivotally mounted vehicle power control pedal, the combination of a movable control member supported for swinging movement below said pedal about a fixed pivot axis, restraining means coacting with said control member to continuously apply thereto a limited restraining force tending to hold the member against swinging movement about its axis, means between said pedal and said member providing for limited lost motion of said pedal relative to said member and for movement of said member by said pedal upon movement of said pedal to a degree exceeding the lost motion between said pedal and said member, adjusting means for said last named means to adjust the amount of lost motion between said pedal and said member, switch means between said pedal and said member, and means for effecting opening of said switch upon movement of said pedal in a power increasing direction in relation to said member and to effect closing of said switch means as an incident to movement of said pedal in a power decreasing direction in an amount to take up said lost motion between said pedal and said member.

References Cited by the Examiner

UNITED STATES PATENTS 2,824,921  2/58  Baumheckel _____ 200—86.5

ROBERT K. SCHAEFER, *Acting Primary Examiner.*

ROBERT K. SCHAEFER, *Examiner.*